United States Patent
Okamoto et al.

(10) Patent No.: US 7,278,741 B2
(45) Date of Patent: Oct. 9, 2007

(54) DISPLAY APPARATUS AND METHOD FOR FORMING AN IMAGE ON A VIEWER'S RETINA

(75) Inventors: Tatsuki Okamoto, Tokyo (JP); Yukio Sato, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 627 days.

(21) Appl. No.: 10/650,077

(22) Filed: Aug. 28, 2003

(65) Prior Publication Data
US 2004/0109136 A1    Jun. 10, 2004

(30) Foreign Application Priority Data
Aug. 30, 2002  (JP)  ............................. 2002-253332

(51) Int. Cl.
*A61B 3/14* (2006.01)
(52) U.S. Cl. .................. 351/206; 351/221; 351/222
(58) Field of Classification Search ............. 359/13, 359/176, 292, 630; 351/211, 200, 205, 221, 351/222; 348/115; 345/8
See application file for complete search history.

(56) References Cited

U.S. PATENT DOCUMENTS

| | | | |
|---|---|---|---|
| 5,371,556 A | | 12/1994 | Suwa et al. |
| 5,714,967 A | | 2/1998 | Okamura et al. |
| 5,760,849 A | * | 6/1998 | Omae et al. .................. 349/5 |
| 6,563,626 B1 | | 5/2003 | Iwasaki |
| 6,712,469 B2 | * | 3/2004 | Ando .......................... 351/211 |
| 2002/0186347 A1 | | 12/2002 | Okamoto et al. |
| 2003/0039036 A1 | * | 2/2003 | Kruschwitz et al. ........ 359/707 |

FOREIGN PATENT DOCUMENTS

| | | |
|---|---|---|
| JP | 8-211325 | 8/1996 |
| JP | 11-298047 | 10/1999 |

* cited by examiner

*Primary Examiner*—Huy Mai
(74) *Attorney, Agent, or Firm*—Leydig, Voit & Mayer, Ltd.

(57) ABSTRACT

A display device for projecting images of an imaging plate into a retina of an eye of a viewer has a light source, a scattering plate for scattering the light from the light source, an imaging plate transmitting the light scattered by the scattering plate, and an optical unit with a lens for focusing the light transmitted through the imaging plate into an eye of the viewer. The scattering plate can move between the light source and the imaging plate.

8 Claims, 13 Drawing Sheets

CONJUGATED RELATIONSHIP

IMAGE OF SCATTERING PLATE FOCUSED

DISPLAY APPARATUS AND METHOD FOR FORMING AN IMAGE ON A VIEWER'S RETINA

FIELD OF THE INVENTION

The present invention relates to a display apparatus for transmitting light through an image plate to form a visual image and then directly projecting the formed image onto a retina of a viewer.

BACKGROUND OF THE INVENTION

JP 2-136818 (A) discloses a display device for projecting an image onto a retina of a viewer or wearer of a device which is illustrated in FIG. 13. The display device has an optical system generally indicated by reference numeral 30. The optical system 30, which is supported by a frame in front of an eye 31 of the wearer, has a plurality of components aligned toward the eye 31 of the wearer, i.e., a point source (light source) 32, an image plate made of a transmitting liquid crystal display (LCD) panel 33 and an eyepiece 34 or lens.

With this arrangement, light emitted from the point source 32 is transmitted through the LCD panel 33. An image formed by light transmitted through the LCD panel 33 is focused by the eyepiece 34 on the pupil 35 and then transmitted through the crystalline lens 36 and the vitreous body 37 onto the retina 38. As described above, the display device is designed so that the point source 32 is focused on the pupil 35, which results in a good directivity of light. Also, even the myoptic and hyperoptic person 31 can view the image displayed on the LCD panel 33 clearly. However, even a slight movement of his or her eye causes his or her iris to shut the incident light and thereby disables him or her from seeing the image. For example, an average diameter of the adult pupil in a dark place is about 7 mm. Then, a movement of the pupil of about ±3.5 mm or more disables the wearer from seeing the image. In a lighted place, the average diameter is reduced to about 4 mm. Therefore, movement of the pupil of about ±2.0 mm or more disables the wearer to see the image.

Another display device has been proposed so far in which a panel-like light source is positioned in close contact with the LCD panel. However, this arrangement is disadvantageous to the display device that the wearer wears it in front of his or her eyes because a sufficient space could not be obtained between the panel-like light source and the LCD due to its compactness requirement. This in turn results in that light transmitted through the LCD panel is reflected in all directions and therefore non-directive light is projected into the pupil of the wearer. This requires the wearer to correct an aberration of the optics which project light into the pupil, which significantly complicates the structure of the optics. Also, the lens of the wearer is required to focus the projected image into his or her retina. However, the distance between the LCD and the pupil is so limited that the wearer with weak eyes needs to wear glasses. Also, moving eyes away from the liquid panel to see natural scenes causes light transmitted through the LCD panel to enter the pupil of the wearer, which results in considerable difficulties in viewing the natural scenes.

In order to solve those problems, another display device is disclosed in JP 8-211325 (A), which includes a panel-like light source in which a number of point sources are aligned in two directional directions. This arrangement, however, is complicated in structure and therefore it is difficult to minimize the device.

SUMMARY OF THE INVENTION

A primary object of the present invention is to provide a display device allowing a viewer or wearer of the apparatus to look at displaying images so clearly.

To this end, a display device for projecting an image onto an eye's retina of a viewer has a light source for emitting light, a scattering plate for scattering the light from the light source, an imaging plate for transmitting the light scattered by the scattering plate and an optical unit with a lens for focusing the light transmitted through the imaging plate into an eye of the viewer, wherein the scattering plate is positioned so that it can move between the light source and the imaging plate.

In another aspect of the present invention, a display device for projecting an image onto an eye's retina of a viewer has a light source for emitting light, a scattering plate for scattering the light from the light source, an imaging plate for transmitting the light scattered by the scattering plate and an optical unit with a lens for focusing the light transmitted through the imaging plate into an eye of the viewer, wherein the scattering plate is positioned at any place between the light source and the imaging plate.

In another aspect of the present invention, a display apparatus for projecting an image onto an eye's retina of a viewer has a light source for emitting light, a scattering plate for scattering the light from the light source, an imaging plate for transmitting the light scattered by the scattering plate, an optical unit with a lens for focusing the light transmitted through the imaging plate into an eye of the viewer and a mechanism for restricting the image transmitting through scattering plate into the imaging plate.

In those arrangements, the light source may take an optically conjugated relationship with a pupil of the viewer.

The device may be so designed that the light from the light source is focused on or around a pupil of the viewer.

The scattering plate may take an optically conjugated relationship with a pupil of the viewer.

The device may be so designed that the light scattered by scattering plate is focused on or around a pupil of the viewer.

The light source may be made of a diode irradiating ultra-violet ray or blue ray and the scattering plate may have a fluorescent material for transforming the irradiated ray into white ray.

The light source may be a combination of sub-sources irradiating red, green and blue rays, respectively.

The light source and the scattering plate may be made of an electroluminescent element.

The scattering plate may be so designed that it has a horizontal length which is greater than a vertical length thereof.

It should be noted that the present application is based upon the Japanese Patent Application No. 2002-253332, which is in its entirety incorporated herein by reference.

PREFERRED EMBODIMENTS OF THE INVENTION

Figure 1A:
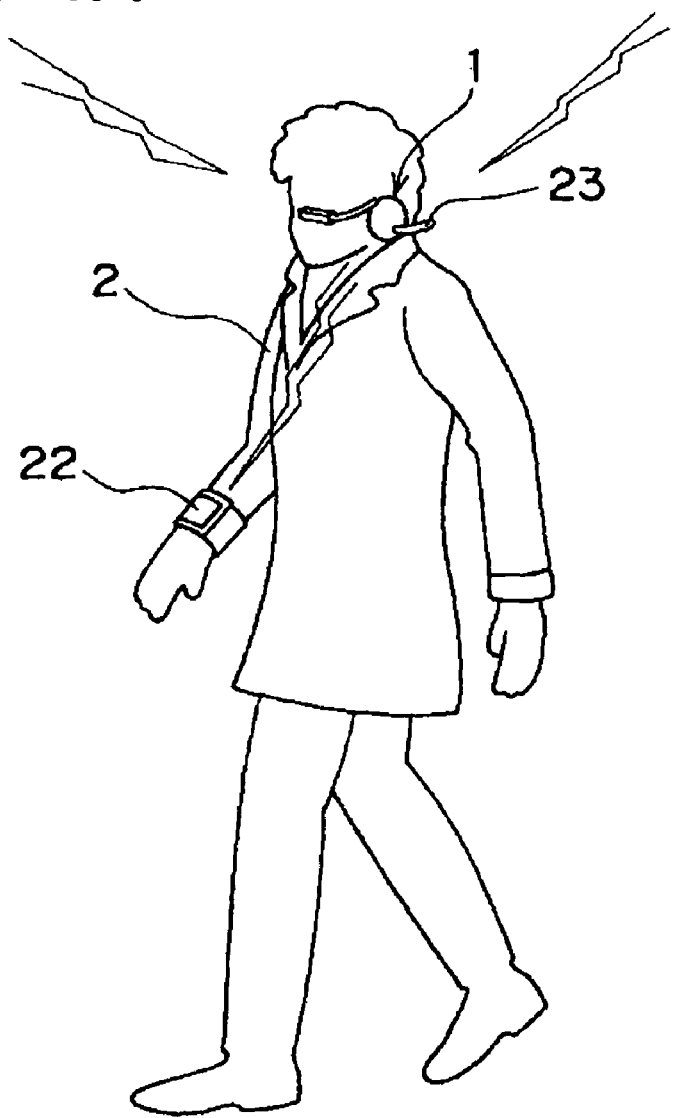
FIG. 1A is a perspective view of a person wearing a display device of the present invention.

Referring to the drawings, various embodiments of the present invention will be described hereinafter. Although various directional expressions including wordings such as "upper", "lower", "left", "right" and/or combinations thereof are used as required in the following descriptions for the better understanding of the invention, they do not limit the scope of the invention.

Figure 1B:
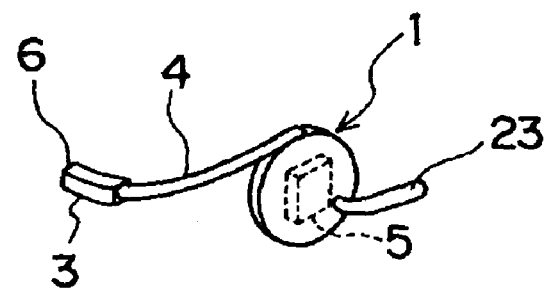
FIG. 1B is a perspective view of the display device of the present invention.

As shown in FIGS. 1A and 1B, a display device for transmitting an image onto a retina of the viewer or wearer, generally indicated by reference numeral 1, is supported on his or her head, allowing the wearer to see an image including live-action and still images. Generally, the display device 1 has an optical unit 3 for projecting the image into the eye of the wearer 2, a frame 4 for supporting the optical unit 3 in a stable manner in front of wearer's eye and an image signal transmitter 5 for transmitting an image signal to the optical unit 3. The structure and arrangement of the components illustrated in the drawing is simply a typical example and then the present invention is not limited thereto.

Figure 2:
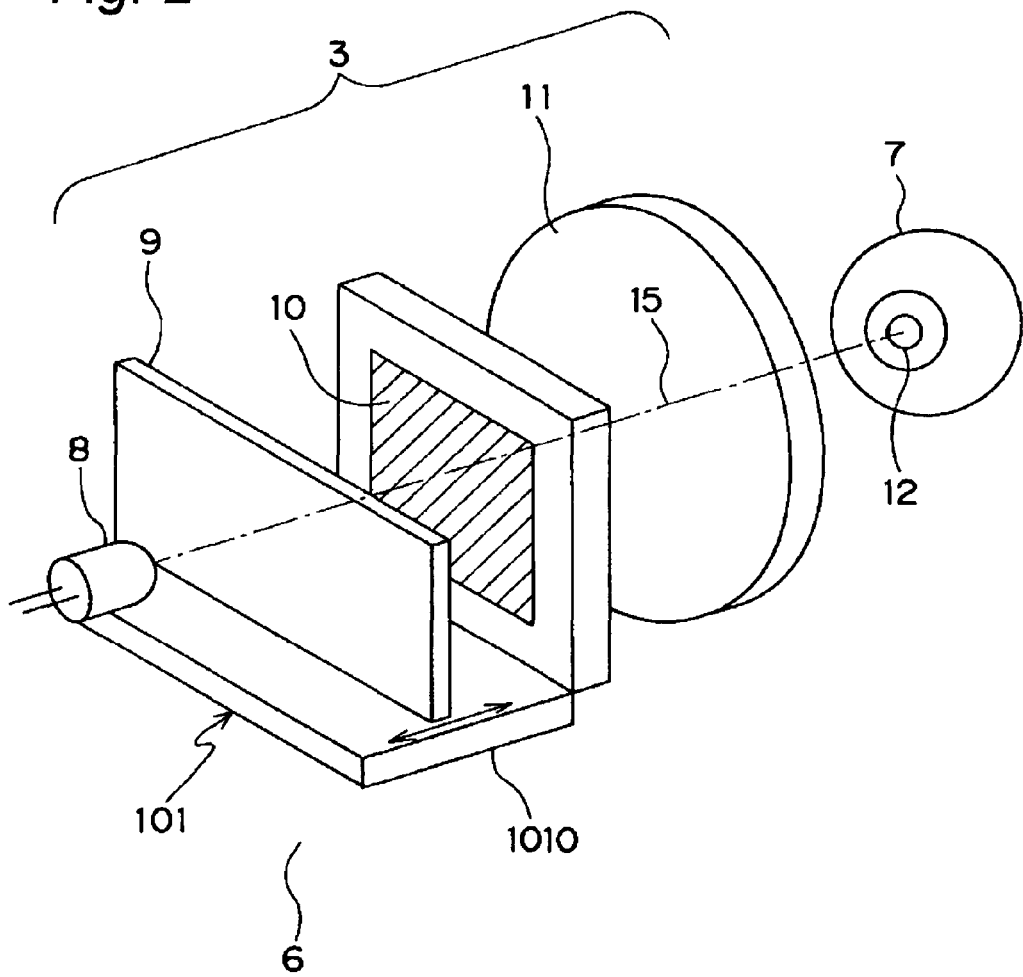
FIG. 2 is an enlarged perspective view of an optical unit incorporated in the display device according to the first embodiment of the present invention.

FIG. 2 schematically illustrates the featured optical unit 3. As shown, a housing 6 (see FIG. 1) of the optical unit 3 accommodates a point light source 8, a scattering member or plate 9, a transmission imaging plate 10 and a lens or eyepiece 11 toward a left or right eye 7 of the wearer 2 or wearer.

A variety of irradiation device may be used for the point source 8. Among other things, a light emitting diode (LED) is preferably used for the point source 8. Also, the point source 8 is not limited to the light source capable of irradiating white ray and it may be another light source capable of irradiating ultraviolet or blue ray. Further, any light source capable of irradiating light from a small region can be used for the point source 8.

The scattering plate 9 is made of material capable of scattering light entering into the scattering plate. In this embodiment, the scattering plate 9 has a rectangular configuration outlined by longer horizontal edges and shorter vertical edges parallel to a body axis of the wearer. For example, the scattering plate 9 is made by adding small particles capable of scattering light (e.g., metal powder) into transparent material such as transparent glass and transparent plastic or by forming small recesses or irregularities in a surface of the transparent plate. The irregularities may be formed by the use of a mold which includes corresponding irregularities defined in its inner surface or by shot-blasting. The scattering plate 9 may be a paper or a ground glass. If the point source 8 uses a diode for emitting ultraviolet or blue light, a suitable fluorescent material for changing that light into white light is preferably contained in the scattering plate 9.

The imaging plate 10, which is a full-color or single-color transmission type liquid crystal display panel, is electrically connected to the signal transmitter 5 (see FIG. 1) so that it receives an image signal from the transmitter 5 and then displays a corresponding image.

A spherical or aspheric convex lens may be used for the lens 11. The lens 11 may be made by a single lens or a combination lens made by plural lens.

With the display device so constructed, light from the point source 8 is projected to the scattering plate 9 where it is scattered in all directions and then transmitted into the imaging plate 10. As shown in FIG. 1, for example, an image signal is transmitted from an image signal transmitter 22 through an image receiver 23 into the image transmitter 5. The image signal received by the image transmitter 5 is then supplied to the imaging plate 10 where it is displayed. The displayed image is then projected onto the eyepiece 11 with the light from the scattering plate 9 and then through a pupil 12 of the wearer 2 into his or her retina 14 with an aid of his or her lens 13.

Figure 3A:
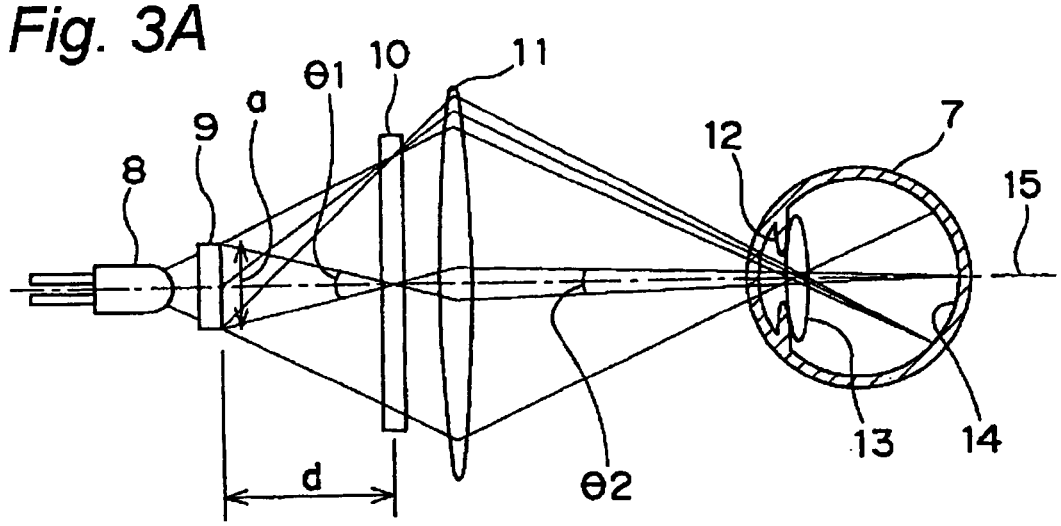
FIG. 3A is a side view of the optical unit incorporated in the display device according to the first embodiment of the present invention.
Figure 3B:
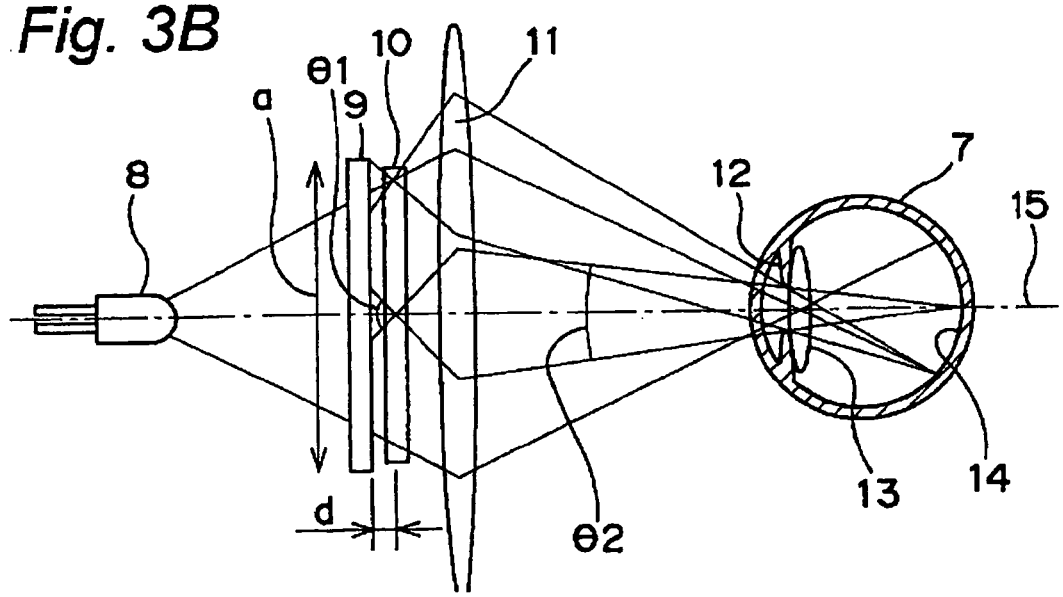
FIG. 3B is a side view of the optical unit incorporated in the display device according to the first embodiment of the present invention and viewed in different angle.

In this arrangement, as best shown in FIGS. 3A and 3B a view angle $\theta 1$ defined when viewing the scattering plate 9 from a certain point of the imaging plate 10 varies according to a distance between the scattering plate 9 and the imaging plate 10. Also, the view angle $\theta 1$ can be defined by two parameters, i.e., one length (a) of the scattering plate 9 in the direction perpendicular to the optical axis 15 and the other length (d) between the scattering plate 9 and the imaging plate 10 in the direction parallel to the optical axis 15.

Assume that, as shown in FIG. 3A, the width (a) in the vertical direction perpendicular to the optical axis 15 is small and the distance (d) between the scattering plate 9 and the imaging plate 10 is large. In this instance, the view angle $\theta 1$ defined when viewing the scattering plate 9 from one point of the imaging plate 10 is relatively small. The view angle $\theta 1$ has a certain relationship with an angle $\theta 2$ of light or luminous flux transmitted from the imaging plate 10 through the eyepiece 11, pupil 12 and lens 13 and then into retina 14, so that the angle $\theta 2$ increases with the view angle θ1. Therefore, the images projected into the eyes are hardly affected by the reflection of the lens or vitreous body 13 of the viewer's eye. This allows even the myoptic and hyperoptic person to see the displayed image so clearly without any control of his or her lens 13. Of course, a person who needs glasses routinely can see the images so clearly not only when he or she is wearing glasses but also when he or she is not wearing them. Also, the wearer can superimpose, without any difficulty, one image or natural scene captured by one eye on the other displayed image captured by the other eye.

However, this arrangement has a disadvantage that, if the pupil 12 is away from the focusing point, the small view angle θ1 causes the pupil 12 to cut the partial or entire image, prohibiting the wearer 2 from seeing the whole image. This in turn requires to adjust the relative positions of the eyepiece 11 and the pupil 12 in a precise manner. Otherwise, the wearer is disable to see the clear image.

On the other hand, as shown in FIG. 3B when the width (a) of the scattering plate 9 is large but the distance (d) between the scattering plate 9 and the imaging plate 10 is small, both the view angle θ1 defined by viewing the periphery of the scattering plate 9 from a certain point of the imaging plate 10 and the angle θ2 defined by light or luminous flux of the image projected from the eyepiece 11 through pupil 12 and lens 13 into retina 14 are relatively large. This prevents the luminous flux from being focused by the eyepiece 12. Therefore, the positions of the eyepiece 11 and the pupil 12 need not to be adjusted precisely, which in turn means that the display device allows the wearer to see the image without any difficulty.

This arrangement further requires the distance between the imaging plate 10 and the eyepiece 11 and the distance between the lens 13 and the retina 14 to be controlled precisely. Then the wearer with weak eyes needs to use glasses or to adjust the distance between the imaging plate 10 and the eyepiece 11 in order to see the image clearly. Also, the wearer is unable to superimpose one image or natural scene captured by one eye on the other displayed image captured by the other eye.

For such reasons, the optical unit 3 of the display device 1, shown in FIG. 2, according to the first embodiment of the present invention has a mechanism 101 for transporting the scattering plate 9 between the light source 8 and the imaging plate 10. A variety of structures may be employed for the moving mechanism 101. For example, in this embodiment the scattering plate 9 is securely supported by a frame 1010 which is in turn supported for movement in a direction parallel to the optical axis 15. The housing 6 may be used as a guide member for guiding the frame 1010. Also, the housing 6 and the frame 1010 may be formed with a guiding portion such as groove and a guided portion capable of engaging with the groove so that the guiding and the guided portions cooperate with each other to cause the frame 1010 to move relative to the housing 6. Another mechanism may be employed in which the frame 1010 has a rack extending in a direction parallel to the optical axis 15 and the housing 6 has a rotatable, small gear or pinion in engagement with the rack to form a rack-and-pinion, allowing the frame 1010 and the scattering plate 9 to move back and forth in the direction.

With the transport mechanism 101, the display device not only takes any one of two conditions shown in FIGS. 3A and 3B but also takes an intermediate condition between them, allowing the wearer to set the display device so that he or she can see the images clearly and easily.

Preferably, even in the display device 1 with the transport mechanism 10, the distance between the light source 8 and the imaging plate 10 is substantially identical to that between the pupil 12 and the retina 14, e.g., about 15 mm. Also, although the transmission scattering plate 8 is employed in this embodiment, it can be a reflection scattering plate. Likewise, although a transmission imaging plate is used in the previous embodiment, it may be replaced with a reflection imaging plate.

Second Embodiment

Figure 4:
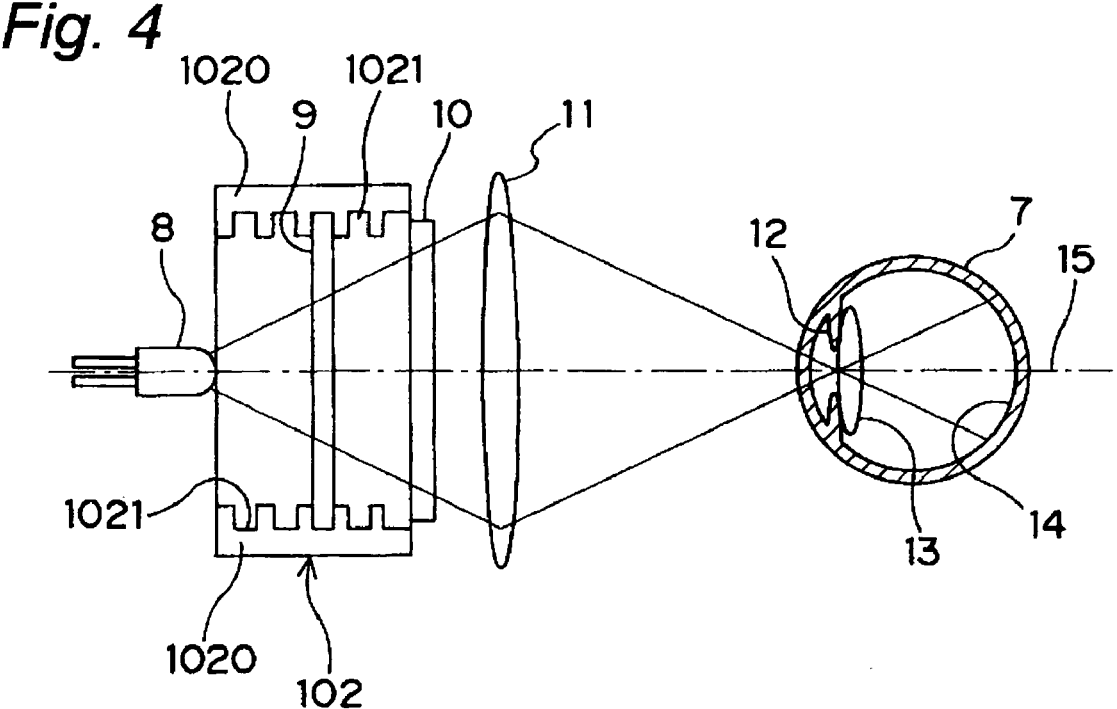
FIG. 4 is a side view of the optical unit incorporated in the display device according to the second embodiment of the present invention.

Although the scattering plate 9 is capable of moving continuously between the light source 8 and the imaging plate 10 in the first embodiment, as shown in FIG. 4 a mechanism 102 for positioning the scattering plate 9 at any one of predetermined positions between the light source 8 and the imaging plate 10. For example, the positioning mechanism 102 has a pair of opposing walls 1020 positioned symmetrically on opposite sides of the optical axis 15. Each of the walls 1020 has a plurality of grooves 1021 or holding portions defined in its surface opposing to the other wall in a symmetric fashion so that the opposite edges of the scattering plate 9 can be held by the opposing grooves 1021 of the walls 1020.

With this arrangement according to the second embodiment, the wearer can set the display device so that he or she can see the images clearly and easily. Also, the structure of the display device can be simplified than that of the first embodiment.

Third Embodiment

Figure 5:
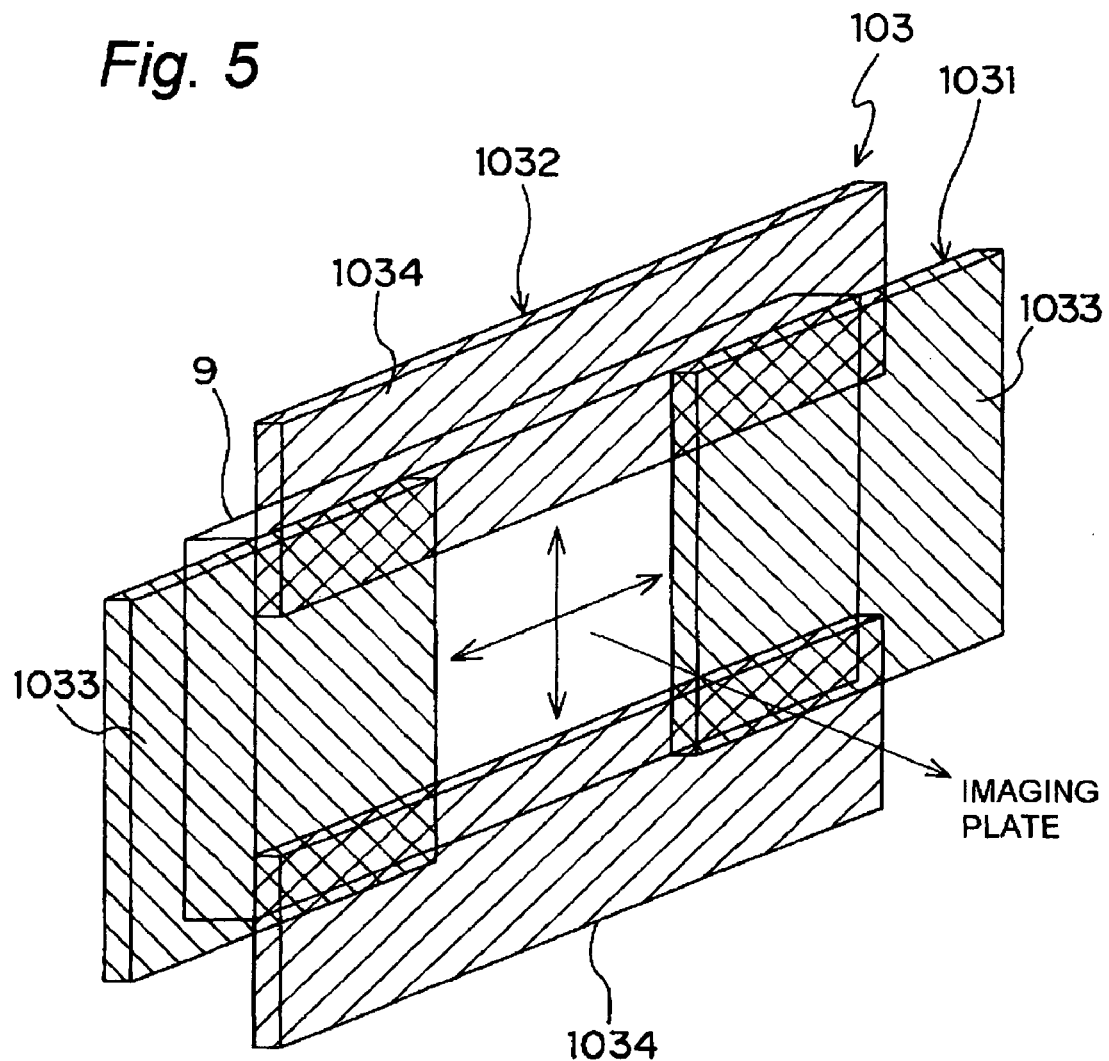
FIG. 5 is a partial perspective view of the optical unit incorporated in the display device according to the third embodiment of the present invention.

FIG. 5 shows a part of the optical unit 3 of the display device 1 according to the third embodiment of the present invention. In this optical unit 3, a mechanism 103 is provided on one side of the scattering plate 9 adjacent to the imaging plate 10 or to the light source 1 for controlling an open ratio of an opening of the scattering plate 9. The adjust mechanism 103 has a lateral adjuster 1031 for controlling a lateral open ratio of the scattering plate 9 and a vertical adjuster 1032 for controlling a vertical open ratio of the scattering plate 9. The lateral adjuster 1031 has a pair of lateral adjusting plates or shutters 1033 positioned on horizontal opposite sides, i.e., on the left and right, of the optical axis 15. Although not shown, the lateral shutters 1033 are supported by a guide mechanism (not shown) provided in the housing 6 of the optical unit 3 so that each of them can be moved to and from the other freely by the wearer 2. Alternatively, the lateral shutters 1033 may be mechanically connected by a gear mechanism or a rack-and-pinion so that moving one shutter 1033 laterally, i.e., from left to right or from right to left, causes the other shutter 1033 to move in the opposite direction, i.e., from right to left or from left to right, in a symmetric manner with respect to the optical axis 15.

Likewise, the vertical adjuster 1032 has a pair of vertical plates or shutters 1034 positioned on vertical opposite sides of, i.e., above and below, the optical axis 15. Although not shown, the vertical shutters 1034 are supported by a guide mechanism (not shown) provided in the housing of the optical unit 3 so that they can be moved up and down freely by the wearer 2. Similar to the lateral shutters 1033, the vertical shutters 1034 may be mechanically connected by a gear mechanism or a rack-and-pinion so that moving one shutter 1033 vertically, i.e., upwardly and downwardly, causes the other shutter 1033 to move in the opposite direction, i.e., downwardly and upwardly, in a symmetric manner with respect to the optical axis 15. Although, as mentioned above, the lateral shutters 1033 and the vertical shutters 1034 are moved independently, they may be connected with each other by a suitable gear mechanism, for example, so that the movement the lateral shutters 1033 toward each other and away from each other causes a simultaneous movement of the vertical shutters 1034 toward each other and away from each other.

With the arrangement, the open ratio of the scattering plate 9 relative to the imaging plate 10 can be adjusted. Then, an effect which is obtained by increasing the distance between the scattering plate 9 and the imaging plate 10 can also be attained by the reduction of the size of the opening of the scattering plate 9. Likewise, another effect which is obtained by reducing the distance between the scattering plate 9 and the imaging plate 10 can also be attained by the enlargement of the opening of the scattering plate 9. Therefore, the wearer can see the images clearly and easily simply by the adjustment of the distance of the opposing vertical shutters 1034.

Fourth Embodiment

Figure 6:
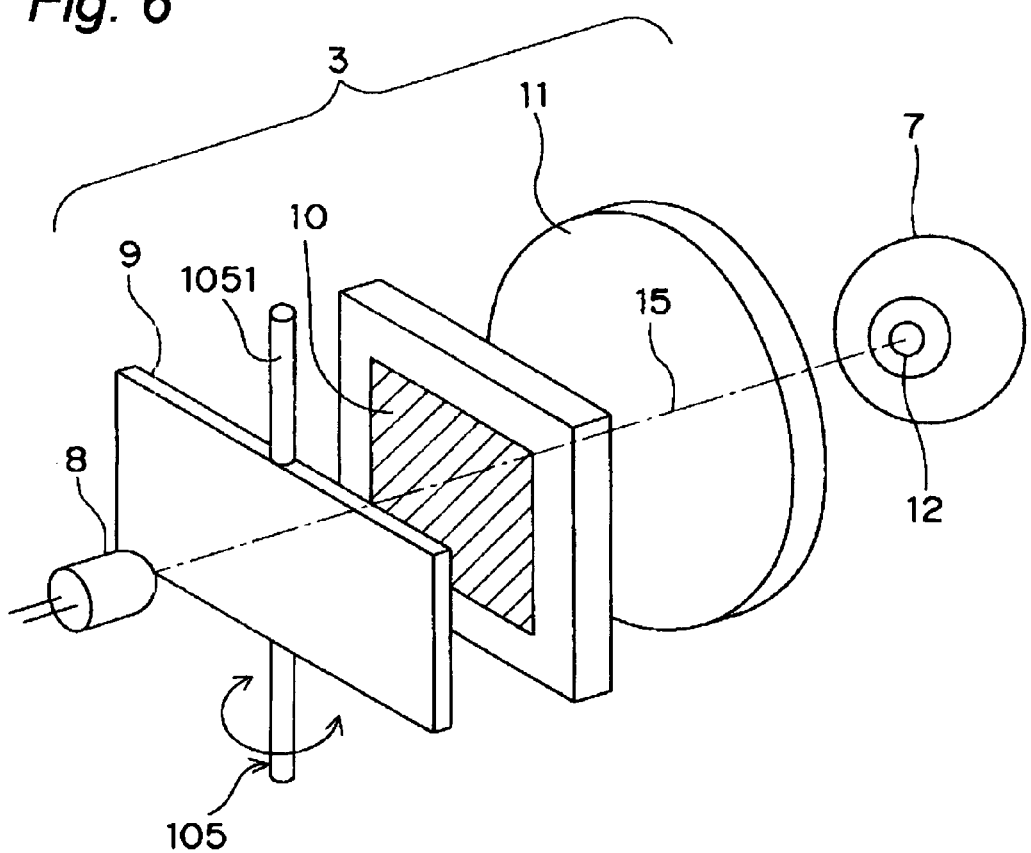
FIG. 6 is a perspective view of the optical unit incorporated in the display device according to the fourth embodiment of the present invention.

FIG. 6 shows the optical unit 3 of the display device 1 according to the fourth embodiment of the present invention. In the optical unit 3, the scattering plate 9 is supported for rotation by a rotation mechanism 105 about an axis perpendicular to the optical axis 15. The rotation mechanism 105 has a shaft 1051 extending perpendicular to the optical axis 15 and supported by a bearing (not shown) mounted in the housing 6. Also, one end of the shaft 1051, which is protruded from the housing 6, carries a gear (not shown) which can be operated by the wearer 2. With the display device 1 so constructed, the size of the scattering plate 9 relative to the imaging plate 10 and viewed in the direction parallel to the optical axis 15 can be varied by rotating the shaft 1051 and, as a result, the scattering plate 9, allowing the wearer to adjust the clearness of the images.

Fifth Embodiment

Figure 7:
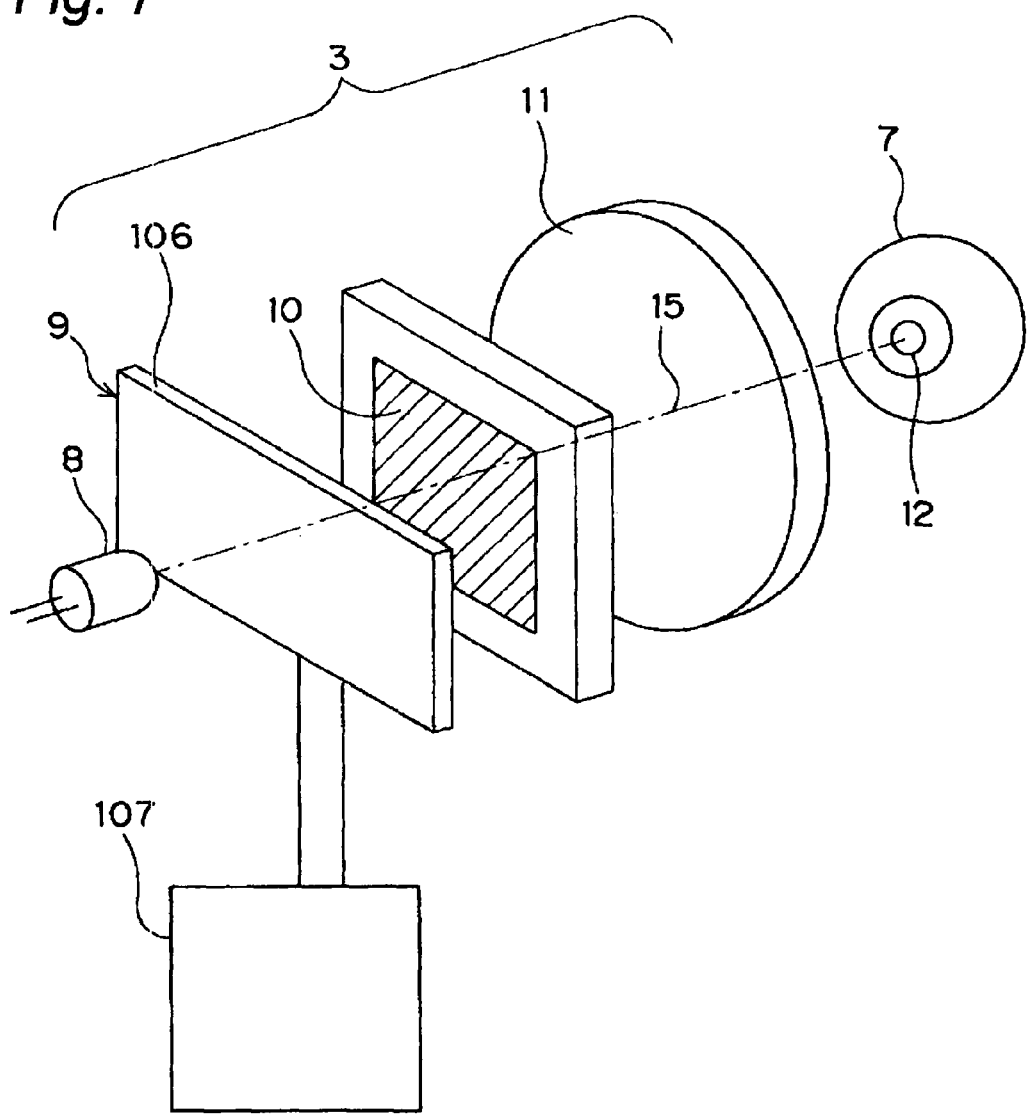
FIG. 7 is a perspective view of the optical unit incorporated in the display device according to the fifth embodiment of the present invention.

FIG. 7 shows another optical unit 3 according to the fifth embodiment of the present invention. According to this optical unit 3, another scattering plate 106 is employed in which a scattering characteristic thereof can be adjusted. The adjustable scattering plate 106 is electrically connected to a controller 107 with which the wearer 2 can control the scattering characteristic thereof. A variety of adjustable scattering plate which is available at present and will be available in the future can be employed. One example of the adjustable scattering plate currently available is a light control glass which includes a pair of parallel glasses and a liquid crystal sheet nipped therebetween. Also, another future example of the scattering plate is a smart optical element in which a smart gel has colorants of pigments and light scattering particles dispersed therein.

With the display device 1 so constructed, the scattering characteristic is controlled by an energy or signal supplied from the scattering characteristic controller 107. Also, when the scattering plate 106 has a reduced the scattering rate, the angle θ2 corresponding the size of image projected from the imaging plate 10 into the retina 14 is determined by a size of light emitting area of the light source 8 and a distance between the light source 8 and the imaging plate 10. Typically the light emitting area of LED, for example, is small. Therefore the angle θ2 defining an image projected from a point in the imaging plate 10 into the retina 14 is also small, so that the image being projected into the retina is unlikely to be affected by a deflection caused by the lens 13. Therefore, even the myoptic and hyperoptic person 2 can see the displaying image so clearly. Of course, the wearer who needs glasses can see the displaying image clearly even when he or she is not wearing the glasses. Also, the wearer can superimpose one image or natural scene captured by one eye on the other displayed image captured by the other eye without any difficulty.

When the scattering plate 106 has an enlarged scattering rate, the distance between the scattering plate 106 and the imaging plate 10 defines the angle θ2 of the light projected from one point in the imaging plate 10 into the retina 14. The angle increases with the decrease of the distance between the scattering plate 106 and the imaging plate 10, which results in that light is unable to be focused by the eyepiece 11. This in turn means that it is not necessary to adjust the relative position of the eyepiece 11 and the pupil 12. However, it is still necessary to adjust the distance between the imaging plate 10 and the eyepiece 11 and the distance between the lens 13 and the retina 14. Therefore, the wearer who needs glasses is required to wear glasses or to adjust the distance between the imaging plate 10 and the eyepiece 11. Also, the wearer can superimpose one image or natural scene captured by one eye on the other displayed image captured by the other eye without any difficulty. With the arrangement, the wearer can set the display device so that he or she can see the images clearly and easily.

Sixth Embodiment

Figure 8:
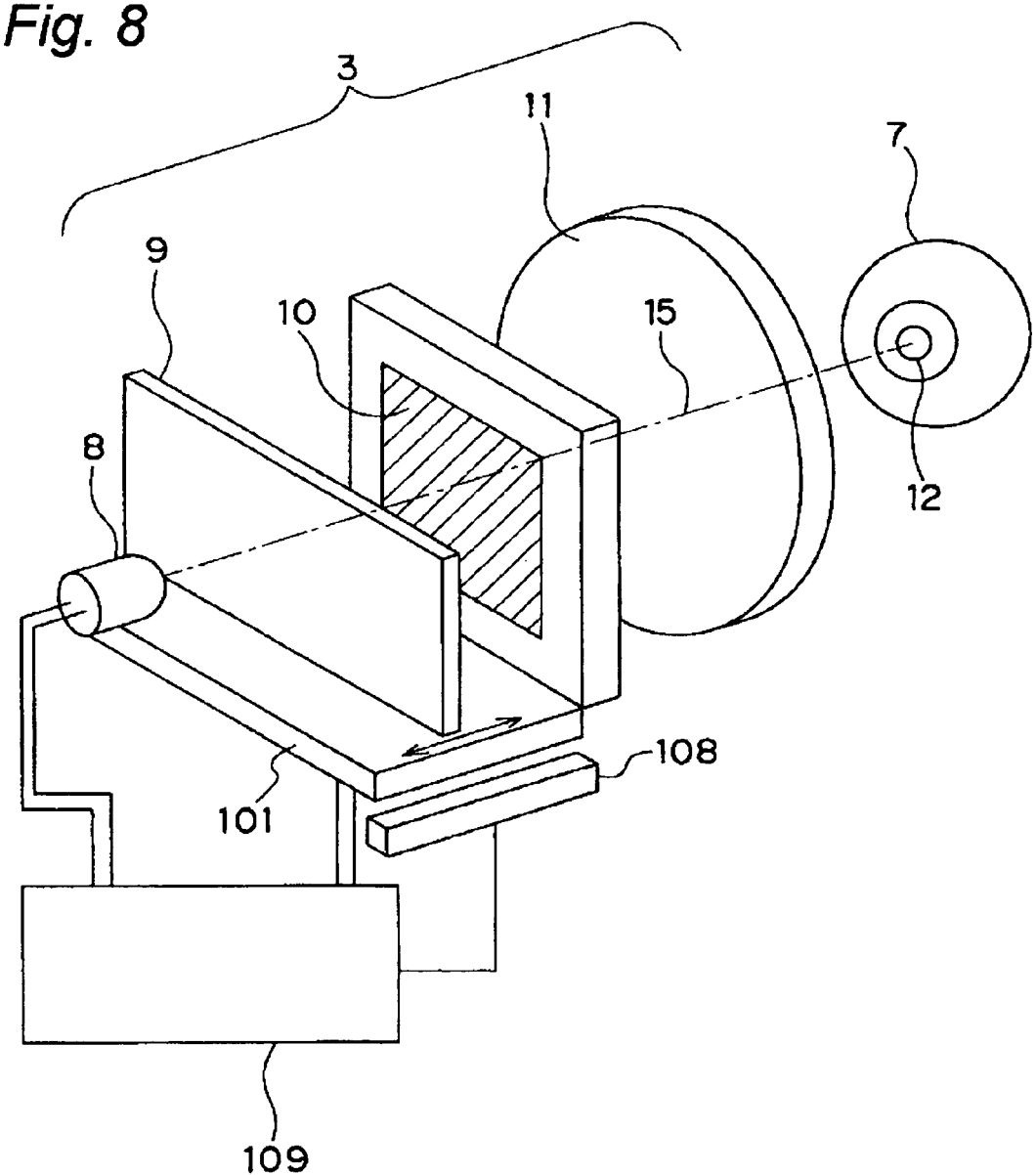
FIG. 8 is a perspective view of the optical unit incorporated in the display device according to the sixth embodiment of the present invention.

FIG. 8 shows another optical unit 3 of the display device 1 according to the sixth embodiment of the present invention. The optical unit 3, which is an improvement of the display device of the second embodiment with a movable scattering plate, has a position detector 108 for detecting a position of the movable scattering plate 9 and a brightness control 109 for controlling a brightness of the light source 8 depending upon the position of the scattering plate 9 detected by the position detector 103. With the display device so constructed, when the position of the scattering plate 9 is changed, the brightness of the light source 8 is controlled by the brightness control 109 depending upon the position of the scattering plate 9 so that an amount of light passing through the pupil 12 is kept substantially constant. This allows the wearer to control the visibility of the displaying images without changing the brightness of the images.

Although the brightness control is provided in the display device with the movable scattering plate, it may also be provided to the display device with the opening ratio control mechanism according to the third embodiment, another display device with the rotational mechanism for rotating the scattering plate according to the fourth embodiment and another display device with the scattering ratio control mechanism according to the fifth embodiment. With the modifications, the brightness of the light source can be controlled according to the open ratio, the angle of the scattering plate and the scattering ratio, making an amount of light passing through the pupil substantially constant.

Seventh Embodiment

Figure 9:
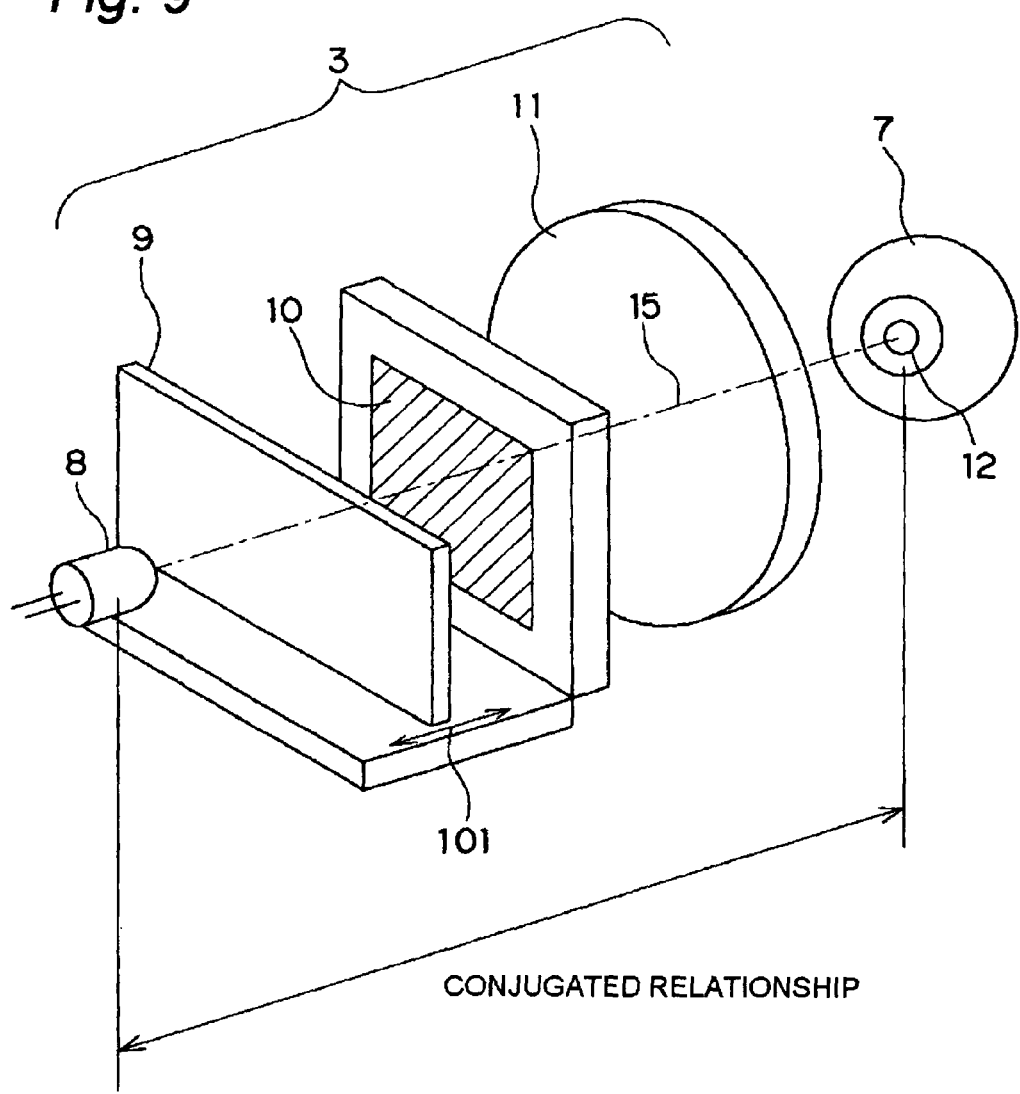
FIG. 9 is a perspective view of the optical unit incorporated in the display device according to the seventh embodiment of the present invention.

FIG. 9 shows another display device 1 according to the seventh embodiment of the present invention. In this display device 1, the light source 8 and the pupil 12 are so arranged that they have an optically conjugated relationship with each other. According to the display device so constructed, when the scattering plate 9 has a reduced scattering rate, the displaying image of the imaging plate 10 is focused on or around the pupil 12 in a region corresponding to the light emitting zone of the light source 8, which result in the Maxwellian view condition. This allows even the myoptic and hyperoptic person to look at the displayed image so clearly without any control of his or her lens 13. Therefore, even the wearer with weak eyes can view images with or without wearing glasses. Also, the wearer can superimpose the image projected on the retina of one eye on a real landscape viewed by the other eye without any difficulty.

Eighth Embodiment

Figure 10:
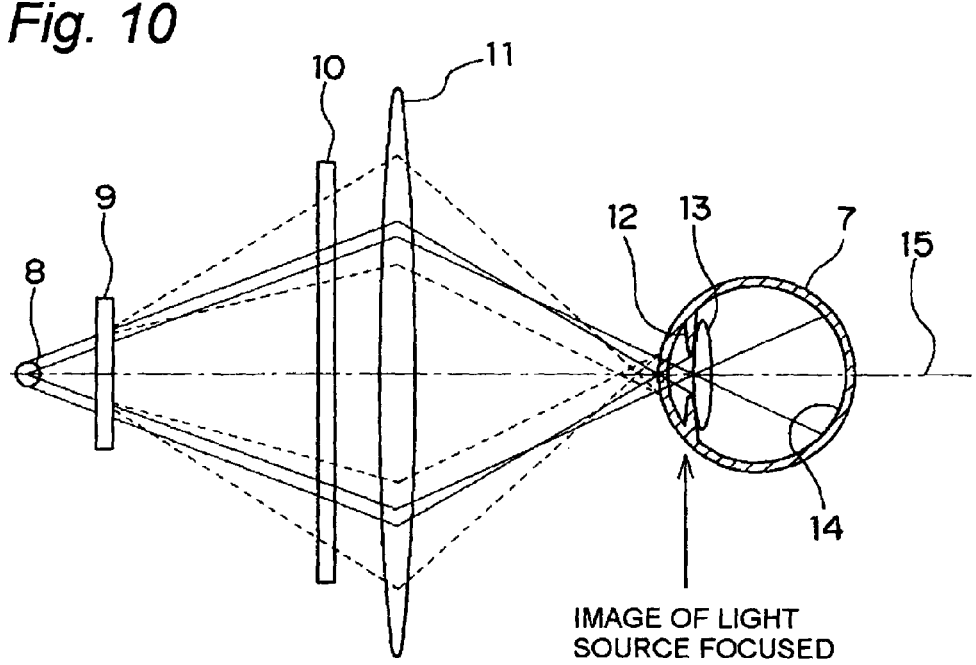
FIG. 10 is a perspective view of the optical unit incorporated in the display device according to the eighth embodiment of the present invention.

FIG. 10 shows the display device according to the eight embodiment of the present invention. The display device 1 is so designed that a shape of the light emitting zone of the light source is focused on or around the pupil 12. Therefore, when the scattering plate 9 has a reduced scattering rate, the displaying image of the imaging plate 10 is focused on or around the pupil 12 in a region corresponding to the light emitting zone of the light source 8, which result in the Maxwellian view condition. This allows even the myoptic and hyperoptic person to look at the displayed image so clearly without any control of his or her lens 13. Therefore, even the wearer with weak eyes can view images with or without wearing glasses. Also, the wearer can superimpose the image projected on the retina of one eye on a real landscape viewed by the other eye without any difficulty.

Ninth Embodiment

Figure 11:
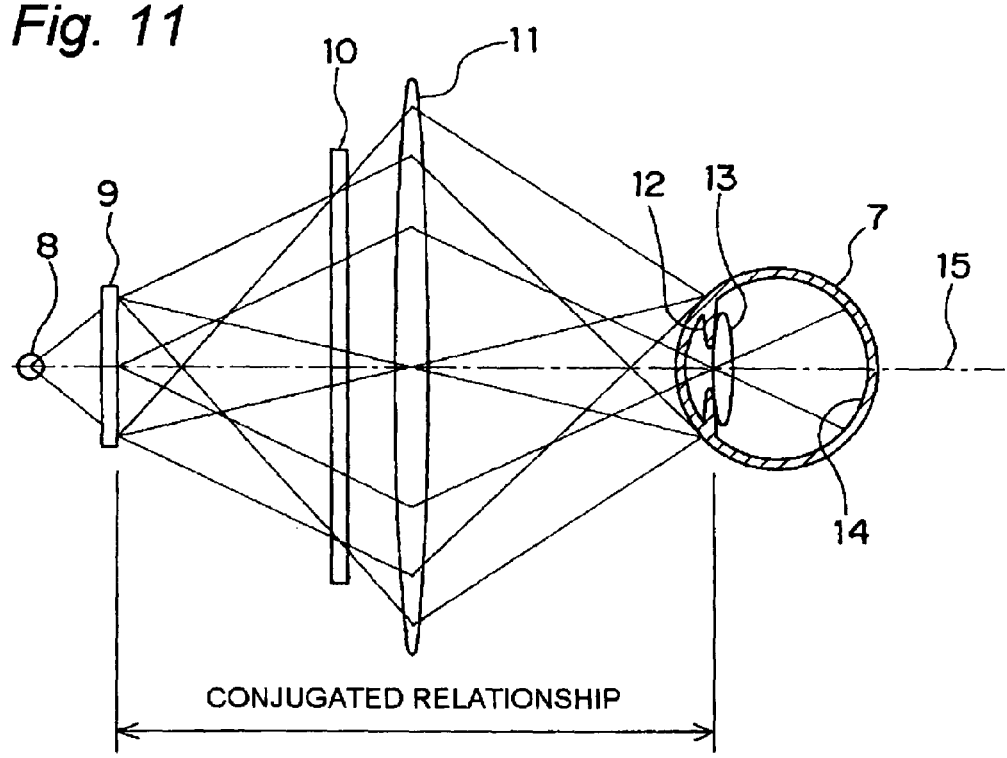
FIG. 11 is a perspective view of the optical unit incorporated in the display device according to the ninth embodiment of the present invention.

FIG. 11 shows another display device 1 according to the ninth embodiment of the present invention. The display device 1 is so designed that the scattering plate 9 takes an optically conjugated relationship with the pupil 12 of the wearer 2. Therefore, even when the scattering plate 9 has an elevated scattering rate, the displaying image of the imaging plate 10 is focused on or around the pupil 12 in a region corresponding to the light emitting zone of the light source 8, which result in the Maxwellian view condition. This allows even the myoptic and hyperoptic person to look at the displayed image so clearly without any control of his or her lens 13. Therefore, even the wearer with weak eyes can view images with or without wearing glasses. Also, the wearer can superimpose the image projected on the retina of one eye on a real landscape viewed by the other eye without any difficulty.

Tenth Embodiment

Figure 12:
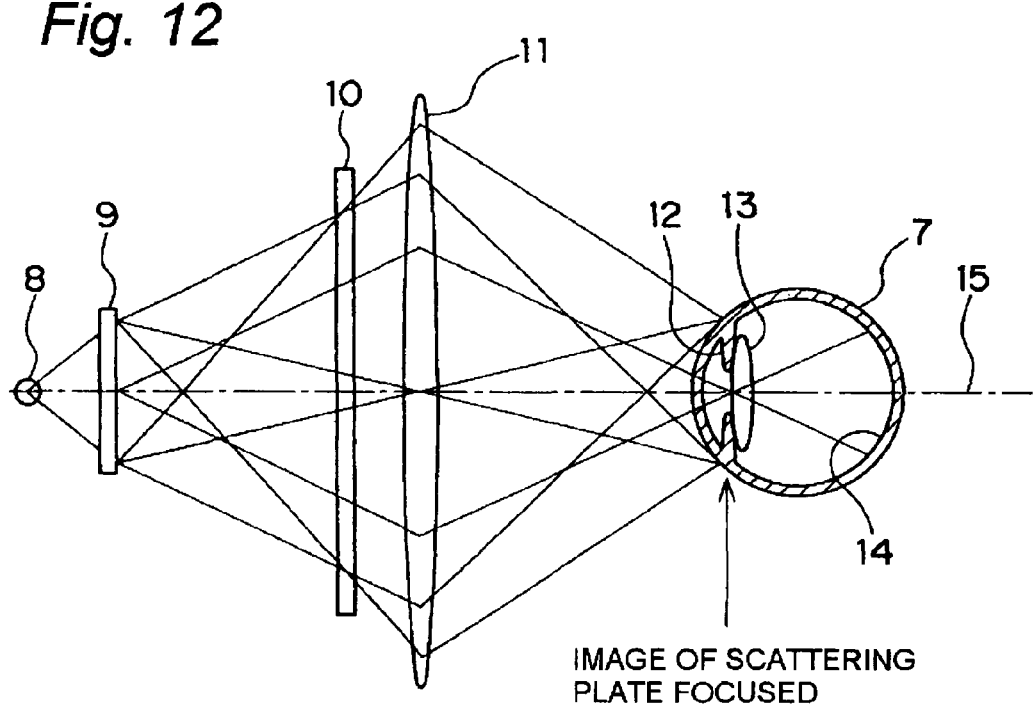
FIG. 12 is a perspective view of the optical unit incorporated in the display device according to the tenth embodiment of the present invention.
Figure 13:
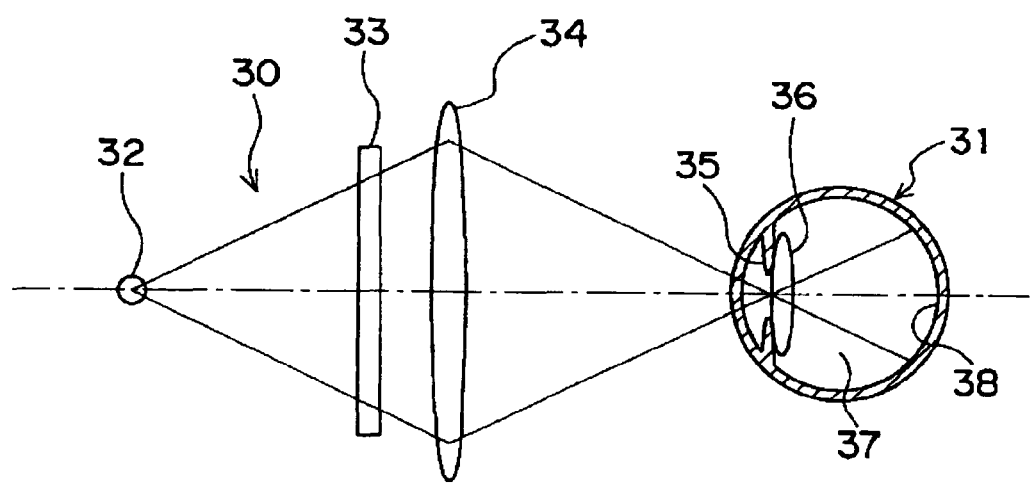
FIG. 13 is a perspective view of the optical unit incorporated in a conventional display device.

FIG. 12 shows another display device 1 according to the tenth embodiment of the present invention. The display device 1 is so designed that the image from the scattering plate 9 is focused on or around the pupil 12 of the wearer 2. Therefore, even when the scattering plate 9 has an elevated scattering rate, the displaying image of the imaging plate 10 is focused on or around the pupil 12 in a region corresponding to the light emitting zone of the light source 8, which result in the Maxwellian view condition. This allows even the myoptic and hyperoptic person to look at the displayed image so clearly without any control of his or her lens 13. Therefore, even the wearer with weak eyes can view images with or without wearing glasses. Also, the wearer can superimpose the image projected on the retina of one eye on a real landscape viewed by the other eye without any difficulty.

Eleventh Embodiment

The structures described with embodiments 7 to 10 can equally be employed for the first to sixth embodiment. Besides, although the point light source is employed in the above-described display device, it may be replaced with another light source in the form of tube. Also, the light source is not limited by color of irradiation light. For example, it is more preferable to use light source capable of irradiating while light, e.g., white LED.

Further, the light source is not limited to a light source irradiating light with a certain wavelength. For example, it may be a combination of plural light sources capable of irradiating red, green and blue colors, respectively. In this instance, a sequential LCD panel may be employed, in which the displaying images are changed in synchronism with the changes of irradiation colors.

Furthermore, although the light source is separated from the scattering plate in the previous embodiments, they may be made of a single component by using an electroluminescent (EL) element.

Moreover, the display device may employ another scattering plate in which the horizontal length is larger than the vertical length. In this instance, the wearer can change between a condition in which the wearer views the displaying images and another condition in which he or she views the natural scenes by moving his or her eyes upward or downward slightly.

What is claimed is:

1. A display apparatus for forming an image on a retina of a viewer, comprising:

a light source emitting light along an optical axis;

a scattering plate scattering the light from the light source;

an imaging plate transmitting the light scattered by the scattering plate;

an optical unit including a lens focusing the light transmitted through the imaging plate; and a mechanism adjusting from one location to another location, along the optical axis, of the scattering plate between the light source and the imaging plate.

2. The display apparatus of claim 1, wherein the mechanism adjusts the scattering plate continuously between the light source and the imaging plate.

3. The display apparatus of claim 1, wherein the mechanism adjusts the scattering plate to any one of predetermined plural positions between the light source and the imaging plate.

4. The display apparatus of claim 1, wherein the light source is a diode radiating ultra-violet light or blue light and the scattering plate includes a fluorescent material transforming the light radiated into white light.

5. The display apparatus of claim 1, wherein the light source is a combination of sub-sources radiating red, green, and blue light, respectively.

6. The display apparatus of claim 1, wherein the light source and the scattering plate are an electroluminescent element.

7. The display apparatus of claim 1, wherein the scattering plate has horizontal and vertical dimensions and the horizontal dimension is longer than the vertical dimension.

8. The display apparatus of claim 7, wherein the scattering plate includes a pair of movable lateral shutters and a pair of movable vertical shutters for adjusting the vertical and horizontal dimensions of the scattering plate that scatters the light from the light source.

* * * * *